Patented Nov. 11, 1952

2,617,803

UNITED STATES PATENT OFFICE 2,617,803

DIALKYLAMINOALKYL ESTERS OF PIPERAZINE CARBOXYLIC ACIDS

Richard J. Turner, Somerville, N. J., assignor to American Cyanamid Company, New York, N. Y., a corporation of Maine No Drawing. Application October 21, 1949, Serial No. 122,865

7 Claims. (Cl. 260—268)

The present invention relates to substituted piperazines. More particularly, it relates to dialkylaminoethyl esters of piperazine-1-carboxylic acids, their salts and methods of preparing the same.

The dialkylaminoethyl piperazine-1-carboxylates of the present invention may be illustrated by the following general formula:

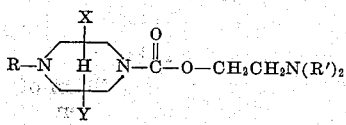

in which R is hydrogen, or an alkyl, aralkyl or aryl radical, R' is a lower alkyl radical of from 1 to 4 carbon atoms and X and Y are hydrogen or lower alkyl radicals.

In general, the compounds of the present invention are colorless to pale yellow oils or low melting solids. The compounds having a hydrogen atom in the 4-position on the piperazine ring (R being hydrogen) are very soluble in or miscible with water. In other compounds wherein the hydrogen in the 4-position is replaced by other groups indicated above the water solubility decreases with the increase in molecular weight of the substituent group in the 4-position. The compounds in general are soluble in the usual organic solvents. Salts of the compounds of the present invention may be formed with acids such as hydrochloric, citric, sulfuric, hydrobromic, tartaric and the like. Some of these addition salts are difficult to isolate as solids because of their marked hygroscopicity; others form well defined white crystalline hydrated or anhydrous salts. In general, the addition salts of the present compounds may be readily prepared by adding an anhydrous acid to an anhydrous solution of the dialkylaminoethyl piperazine-1-carboxylate in an organic ether solvent and isolating the precipitated salt by filtration.

The preparation of the new compounds of the present invention may be accomplished in several ways depending to a large extent on the nature of the product desired. We prefer to prepare the compounds by heating a piperazine-1-carboxylate having the formula:

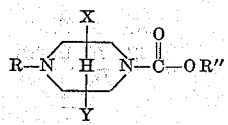

in which R, X and Y are as defined above and R'' is an alkyl or aralkyl radical with a dialkylaminoethanol in the presence of an alkali metal alcoholate, such as sodium or potassium diethylaminoethylate. As starting material we can use compounds such as 1-carbethoxypiperazine, 1-carbethoxy - trans - 2,5 - dimethylpiperazine, 1 - carbethoxy - 4 - methylpiperazine, 1 - carbomethoxy - 4 - methylpiperazine, 1 - carbethoxy - 4 - benzylpiperazine, 1 - carbethoxy - 4 - phenylpiperazine, 1 - carbobenzoxypiperazine, 1 - carbobenzoxy-4-methylpiperazine and the like.

As intermediates to be reacted with the piperazine-1-carboxylates we can use compounds such as 2-dimethylaminoethanol, 2-diethylaminoethanol, 2 - ethylmethylaminoethanol, 2 - dipropylaminoethanol, 2 - ethylpropylaminoethanol, 2 - dibutylaminoethanol, etc.

The reaction for preparing the compounds of the present invention may be carried out in the presence of an excess of the dialkylaminoethanol and an alkali metal such as sodium or potassium. It is believed that the alkali metal forms an alcoholate with the amino alcohol which in turn reacts with the piperazine-1-carboxylates to produce the desired compound. The reaction is preferably carried out at a temperature of from 50° C. to 175° C. Best results have been obtained by heating the reaction mixture under reduced pressure, followed by further heating at atmospheric pressure. In general, the yields obtained under these conditions were superior to those obtained by heating the reaction mixture under reduced pressure or at atmospheric pressure alone.

The compounds of the present invention may be isolated and purified by distillation. The desired compounds have boiling points higher than any of the starting materials and therefore are easily separated from the intermediates used. Redistillation of the highest boiling fraction is usually sufficient to give a product of highest purity.

Some of the compounds of the present invention, particularly those having an aralkyl radical in the 4-position on the piperazine ring, may be prepared by heating a 2-dialkylaminoethyl piperazine-1-carboxylate with an active aralkyl halogen compound such as benzyl chloride, bromomethylnaphthalene and the like. The products obtained by this method are 2-dialkylaminoethyl 4-aralkyl piperazine-1-carboxylates. This reaction is preferably carried out by heating the two reactants in an alkanol solvent such as methanol, ethanol, and the like, in the presence of an acid-binding alkali metal salt such as sodium bicarbonate, potassium carbonate, sodium acetate and the like. The examples which follow show the preparation of 4-aralkyl derivatives by the above method. Similarly, the 4-alkyl derivatives may be prepared by reacting a 2-dialkylaminoethyl piperazine-1-carboxylate with an alkyl halide.

The compounds of the present invention are useful as new pharmaceutical products because of their physiological activities and relatively low toxicity. Some of the compounds exhibit analgesic properties, others are useful because of other properties.

The following examples illustrate in greater particularity the preparation of dialkylaminoethyl piperazine-1-carboxylates within the scope of the present invention.

Example 1

In a flask connected to a condenser and receiver is placed 817 parts of 2-dimethylaminoethanol, which contains 8 parts of dissolved sodium, and 474 parts of 1-carbethoxypiperazine. The mixture is heated first between 60°–67° C. for 7 hours at 32–38 mm. pressure and then at 140° C. for 7 hours at atmospheric pressure. The resultant solution is carefully fractionated at reduced pressure to remove excess 2-dimethylaminoethanol and unreacted 1-carbethoxypiperazine. A crude fraction, boiling point 140°–160° C. at 15–25 mm. is collected and redistilled to yield 2-dimethylaminoethyl piperazine-1-carboxylate, a colorless oil, boiling point 114°–117° C./0.5–1 mm., $n_D^{25}$ 1.4823.

Example 2

Four parts of sodium are dissolved in 928 parts of 2-diethylaminoethanol and 474 parts of 1-carbethoxypiperazine are added to the solution. The mixture is then heated in a manner similar to that described in Example 1, first at reduced pressure, in this case at 40 mm. for 7 hours at 88° C., and then at the boiling point of 2-diethylaminoethanol for 7 hours at atmospheric pressure. The 2-diethylaminoethyl piperazine-1-carboxylate is a colorless oil, boiling point 144.5°–147° C./4 mm., $n_D^{25}$ 1.4803.

Example 3

A mixture consisting of 332 parts of 2-diethylaminoethanol containing 3 parts of dissolved sodium and 186 parts of 1-carbethoxy-trans-2,5-dimethylpiperazine is heated in a manner described in Example 2. A colorless oil, 2-diethylaminoethyl trans-2,5-dimethylpiperazine-1-carboxylate, boiling point 144°–147° C./1 mm., $n_D^{25}$ 1.4760 is collected.

Example 4

A mixture of 468 parts of 2-diethylaminoethanol containing 4 parts of dissolved sodium and 172 parts of 1-carbethoxy-4-methylpiperazine is heated under reduced pressure and at atmospheric pressure in a manner similar to that described in Example 2. Purified material consists of 2-diethylaminoethyl 4-methylpiperazine-1-carboxylate, a colorless oil, boiling point 127°–128° C./1 mm. $n_D^{25}$ 1.4700.

Example 5

A mixture consisting of 23 parts of 2-diethylaminoethyl piperazine-1-carboxylate, 25 parts of sodium bicarbonate, 12.7 parts of benzyl chloride and 100 parts of ethyl alcohol is heated under refluxing conditions for three hours. The inorganic salts present are removed by filtration and the alcoholic filtrate is evaporated under reduced pressure. Water is added to the residue, and the oil that appears is extracted with ether. The ether is dried and treated with hydrogen chloride gas. The 2-diethylaminoethyl 4-benzylpiperazine-1-carboxylate dihydrochloride hemihydrate that precipitates is collected and recrystallized from an alcohol-ether solvent to yield a white solid, melting point 194.0°–195.5° C.

Example 6

A mixture of 234 parts of 2-diethylaminoethanol which contains 2 parts of dissolved sodium and 93.5 parts of 1-carbethoxy-4-phenylpiperazine is treated in a manner similar to that described in Example 1. The product, 2-diethylaminoethyl 4-phenylpiperazine-1-carboxylate is a pale yellow liquid, boiling point 175°–178° C./1 mm., $n_D^{25}$ 1.5328.

Example 7

A salt is prepared by passing hydrogen chloride gas into an ethereal solution of 2-diethylaminoethyl 4-methylpiperazine-1-carboxylate. The product, 2-diethylaminoethyl 4-methylpiperazine-1-carboxylate dihydrochloride, is obtained as a white solid which melts after recrystallization from alcohol-ether at 196.3°–198.3° C. with effervescence.

Example 8

A salt is obtained by the addition of hydrogen chloride gas to an ethereal solution of 2-diethylaminoethyl 4-phenylpiperazine-1-carboxylate. The white solid obtained in this manner is 2-diethylaminoethyl 4-phenylpiperazine-1-carboxylate dihydrochloride hemihydrate which melts at 161.2°–165.2° C. after purification from alcohol-ether.

I claim:

1. Compounds having the general formula:

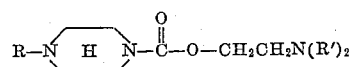

in which R is a monocyclic aralkyl radical and R' is a lower alkyl radical.

2. Compounds having the general formula:

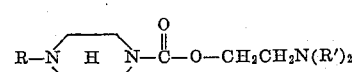

in which R is a monocyclic aryl radical and R' is a lower alkyl radical.

3. 2-diethylaminoethyl trans-2,5-dimethylpiperazine-1-carboxylate.

4. 2-diethylaminoethyl 4-benzylpiperazine-1-carboxylate.

5. 2-diethylaminoethyl 4-phenylpiperazine-1-carboxylate.

6. Compounds of the group consisting of those having the general formula:

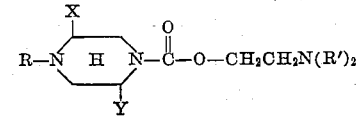

in which R is a member of the group consisting of hydrogen, lower alkyl, monocyclic aralkyl and monocyclic aryl radicals, R' is a lower alkyl radical, X and Y are members of the group consisting of hydrogen and lower alkyl radicals and addition salts thereof.

7. Compounds having the general formula:

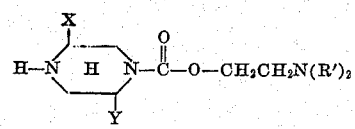

in which R', X and Y are lower alkyl radicals.

RICHARD J. TURNER.

REFERENCES CITED

The following references are of record in the file of this patent:

UNITED STATES PATENTS

| Number | Name | Date |
|---|---|---|
| 2,218,739 | Bruson | Oct. 22, 1940 |
| 2,472,496 | Stewart | June 7, 1949 |
| 2,474,651 | Blicke | June 28, 1949 |
| 2,485,550 | Aeschlimann et al. | Oct. 25, 1949 |

FOREIGN PATENTS

| Number | Country | Date |
|---|---|---|
| 539,329 | Germany | May 9, 1930 |

OTHER REFERENCES

Swan et al.: Amer. J. Opthalmology 27, 933–940 (1944).

Groggins: Unit Processes in Organic Synthesis, third ed., pp. 635–636 (1947), McGraw-Hill Book Co., Inc., New York, N. Y.

Reid, Ind. Eng. Chem. 40, 1598 (1948).